United States Patent [19]

Nagamune et al.

[11] Patent Number: 5,182,565
[45] Date of Patent: Jan. 26, 1993

[54] IN-FURNACE SLAG LEVEL MEASURING METHOD AND APPARATUS THEREFOR

[75] Inventors: Akio Nagamune; Kouichi Tezuka; Isamu Komine; Shinji Kuriyama; Masaki Komatani; Akihiko Inoue, all of Tokyo, Japan

[73] Assignee: NKK Corporation, Tokyo, Japan

[21] Appl. No.: 675,759

[22] Filed: Mar. 27, 1991

[30] Foreign Application Priority Data

| Mar. 30, 1990 | [JP] | Japan | 2-81312 |
| Mar. 30, 1990 | [JP] | Japan | 2-81313 |
| Mar. 30, 1990 | [JP] | Japan | 2-81314 |

[51] Int. Cl.$^5$ ............................................. G01S 13/08
[52] U.S. Cl. .................................................... 342/124
[58] Field of Search ......... 342/124; 73/61 LM, 290 R

[56] References Cited

U.S. PATENT DOCUMENTS

| 3,701,518 | 10/1972 | Heff | 342/124 X |
| 3,727,897 | 4/1973 | Bennett | 342/124 |
| 4,044,356 | 8/1977 | Fournier . | |
| 4,210,023 | 7/1980 | Sakamoto et al. | 342/124 |
| 4,442,513 | 4/1984 | Mead . | |
| 4,933,916 | 6/1990 | May et al. . | |

Primary Examiner—Mark Hellner
Attorney, Agent, or Firm—Michael N. Meller

[57] ABSTRACT

Disclosed is a in-furnace slag level measuring method for measuring a slag level in a convertor and an apparatus therefor. A sublance and an antenna of a microwaver radar are arranged exchangeable therebetween so that the sublance and the antenna are alternatively inserted in to the convertor from about the convertor. The antenna is inserted into the convertor in first and middle stage of the refining operation of the converter to thereby measure the slag level, and the sublance is inserted into the convertor to thereby perform various measurement.

9 Claims, 12 Drawing Sheets

PSEUDO RANDOM SIGNAL GENERATER

| ADDRESS | DATA IN MEMORY |
|---|---|
| 0 | 1 1 |
| 1 | 1 1 |
| 2 | 1 1 |
| 3 | 1 0 |
| 4 | 1 0 |
| 5 | 1 1 |
| 6 | 1 0 |
| 7 | 0 0 |
| 8 | 0 0 |
| ⋮ | ⋮ |
| 127 | 0 0 |

| INPUT DATA | OUTPUT SIGNAL |
|---|---|
| 1 1 | + |
| 1 0 | − |
| 0 1 | 0 |
| 0 0 | 0 |

IN-FURNACE SLAG LEVEL MEASURING METHOD AND APPARATUS THEREFOR

BACKGROUND OF THE INVENTION

The present invention relates to an in-furnace slag level measuring method for predicting the occurrence of slopping in a refining period in a convertor, and an apparatus therefor.

Slag floating on a surface of molten metal in a convertor in a refining period foams according to factors for refining in the convertor, that is, according to factors such as the composition and viscosity of the slag, the oxygen content of the slag, etc. When the foaming of the slag progresses excessively, so-called slopping occurs to have a bad influence on the composition of the molten metal, the total yield of the refined product, etc. When such slopping progresses further, problems arise as to the reduction of workability, the reduction of the calorie of exhaust gas, the worsening of working environment such as production to red smoke, the damage of the apparatus, etc.

On the other hand, use of a slag foaming suppressing agent or suppressing of the amount of oxygen supplied for a lance to thereby reduce the amount of generated exhaust gas is considered from the point of view of prevention of the slopping of slag. However, use of an excessive amount of the slag foaming agent brings the following two disadvantages; increase in cost; and worsening of thermal efficiency caused by lowering of in-furnace temperature. Further, suppressing of the amount of supplied oxygen brings elongation of operation caused by reduction of reaction efficiency, that is, it brings worsening of the productivity.

Accordingly, not only prediction of slopping but grasping of the slag level in the convertor quantitatively and accurately for the proper operation of the convertor are necessary for the prevention of the occurrence of slopping.

Therefore, a technique for measuring the slag level in the convertor quantitatively has been considered. As the conventional technique, a radar type level meter using microwave capable of propagating straight even under the measuring environment that dust or flame is present in the convertor has been considered chiefly.

An example of the conventional slag level meter using a microwave radar has been disclosed in Japanese Patent Unexamined Publication No. Sho-63-21584. In the disclosed slag level meter, a microwave FMCW type radar antenna for a carrier frequency of about 10 GHz is fixed to an upper portion of a body of the convertor to transmit a microwave toward the surface of slag through the antenna. The propagation time required for the reciprocating motion of the microwave signal between the antenna and the slag surface, that is, the time from the point of time when the microwave signal is transmitted through the antenna to the point of time when the microwave signal is received through the antenna after reflected on the slag surface, is measured and converted into a distance. However, the conventional slag level meter has a disadvantage in that a shortage of sensitivity may arise in the FMCW type radar in the case where the surface of foamed slag is low in reflectivity with respect to such a microwave.

To solve the problem in the FMCW type radar, an improved slag level meter has been proposed in Japanese Patent Unexamined Publication No. Hei-2-98685 filed by the Assignee of the present invention. In the improved slag level meter, a pseudo random signal processing type microwave radar using a microwave with a carrier frequency of about 10 GHz is employed. In the slag level meter, a water-cooled antenna attached to an end of a water-cooled waveguide is inserted down into the convertor and then fixed. The propagation time required for the reciprocating motion of a microwave between the water-cooled antenna and the slag surface, that is, the time from the point of time when the microwave is transmitted through the water-cooled antenna to the point of time when the microwave signal is received through the water-cooled antenna after reflected on the slag surface, is measured and converted into a distance.

In those conventional techniques, it is necessary to secure an antenna fixture place or an antenna insertion hole in a hood being in the upper portion of the convertor, because the antenna must be provided in any case. However, space assignment for attaching the antenna to the hood is so complex that an increase in the equipment cost is brought, because attendant equipment of the convertor, such as a mainlance, a sublance, a submaterial supply hopper, a dust, etc. is provided with high density. In particular, in the case where a general convertor is rebuilt to attach the antenna thereto or in the case where a boiler piping is provided to the hood to recycle exhaust heat for the purpose of energy saving required in the recent years, the rebuilding of the hood is high in cost.

SUMMARY OF THE INVENTION

An object of the present invention is to provide an in-furnace slag level measuring method and an apparatus therefor, in which a hole which serves as a sublance insertion hole for inserting a sublance into a convertor at the last stage of a refining period is commonly used as an antenna insertion hole so that the hole is used alternately for an antenna and sublance in the refining period in the convertor.

Another object of the present invention is to provide an in-furnace slag level measurement apparatus which can measure a slag level accurately and continuously by using a low-cost apparatus without influence of the measurement environment in which dust or the like is present.

It is another object of the present invention to provide an in-furnace slag level measuring apparatus in which the in-furnace slag level is measured by using pseudo random signals such as Barker codes or the like.

It is a further object of the present invention to provide an in-furnace slag level measuring apparatus in which a slag level position in a furnace can be measured with high accuracy even when the change of the slag level in the furance is severe.

According to an aspect of the present invention, in the in-furnace slag level measuring method and apparatus, a sublance and an antenna in a slag level meter (microwave radar) are alternately inserted into a common hole in a hood of a convertor in a short time. Accordingly, equipment for the method and apparatus is simple in construction because the two purposes can be attained by one common hole. In particular, in the case where a general convertor having a sublance insertion hole is used, the rebuilding thereof is easier. The state of slag can be grasped exactly to predict the occurrence of slopping accurately by measuring the slag level while inserting the antenna into the convertor at the first and second (middle) stages of the refining period. Accordingly, slopping can be prevented by a slopping suppressing means. As a result, a refining procedure with good efficiency can be provided in the convertor. Further, a sublance is inserted into the convertor at the last stage of the refining period to perform measurement of the temperature of a molten metal, picking-up of a molten metal sample, picking-up of a slag sample, etc. through the sublance inserted into the convertor.

According to another aspect of the invention, the in-furnace slag level measuring method and apparatus has a sublance attached to a beam in the upper portion of a convertor so as to be both rotatable and up/down movable, a water-cooled antenna attached to the beam in the upper portion of the convertor so as to be both rotatable and up/down movable, and a microwave radar connected to the water-cooled antenna. The sublance and the water-cooled antenna can be placed alternately so that one of the two is inserted to the convertor through a common hole of a hood of the convertor. Because the sublance and the water-cooled antenna are respectively attached to the beam so as to be rotatable and up/down movable, the positions of the two can be exchanged with each other by rotating the two. That is, the sublance or the water-cooled antenna can be inserted into the convertor according to the necessity.

According to a still further aspect of the present invention, the microwave radar has a transmission antenna and a reception antenna inserted into the furnace, to generate a slag level measured value signal by calculating the distance between the antennas and the slag surface on the basis of a microwave signal transmitted through the transmission antenna, reflected on the slag surface in the furnace and received through the reception antenna.

According to a further aspect of the present invention, the microwave radar measures the distance to a slag surface through the steps of: transmitting a carrier phase-modulated on the basis of a first pseudo random signal toward a slag surface; obtaining a time-series pattern of a detection signal by detecting a carrier obtained by multiplying a reception signal reflected on the slag surface by a second pseudo random signal; obtaining a time-series pattern of a multiplication value by directly multiplying the first and second pseudo random signals by each other; and measuring the time difference between the time-series pattern of the detection signal and the time-series pattern of the multiplication value. Accordingly, the following effects can be attained.

(1) Because of non-contact measurement, durability of sensor portions such as an antenna, etc. can be secured and, at the same time, both the device attachment and maintenance can be simplified.

(2) Because of continous measurement, a measurement of high response can be made.

(3) Because spectrum-diffused signals using pseudo random signals are used, both the noise reduction and signal emphasis can be attained by application of a correlation processing using a reference pseudo random signal in the reception portion. Accordingly, the wave reflected on a slag surface having a low reflectivity can be detected sensitively, so that the measurement can be used for the purposes.

(4) Because the high-speed signal conventionally used for a measurement can be converted into a low-speed signal by a circuit relatively simple in construction according to the invention, a low-cost and small-size apparatus can be provided. Further, adjustment is made easily.

As means for detecting a carrier reflected on the slag surface and subjected to a correlation processing after reception to obtain a detection signal, an inphase component and a quadrature component as to the phase of the transmission carrier are extracted from the carrier after the correlation processing. The components are respectively squared through low-pass filters and then added to each other to obtain a detection signal. Accordingly, the slag surface can be detected very sensitively.

A carrier phase-modulated with a first pseudo random signal is transmitted to a target and a reception signal reflected on the target is subjected to a correlation processing by using a second psuedo random signal having the same pattern as the first pseudo random signal and having a frequency near the frequency of the first pseudo random signal to thereby obtain the thus processed carrier. Accordingly, the measurement time between a detection signal from the target and a reference signal is very greatly enlarged on a time axis. Therefore, the distance to the target can be measured accurately even when the distance is short. Further, the necessary signal reflected on the target as a subject of the measurement can be clearly discriminated/-separated from unnecessary signals reflected on other matters than the target surface, on the time axis in which the detection signal is generated. Accordingly, the slag level in the furnace can be measured stably even under measurement environment of narrow space such as the inside of the furnace in which unnecessary reflected signals will be generated easily, because the unnecessary reflected signals can be removed.

That is, in the present invention, a first pseudo random signal and a second pseudo random signal having the same pattern as that of the first pseudo random signal and having a frequency slightly different from the frequency of the first pseudo random signal are generated by a first pseudo random signal generation means and a second pseudo random signal generation means, respectively. A spectrum-diffused signal formed by phase-modulating a carrier on the basis of the first pseudo random signal is transmitted toward a target by a transmission means. Then, a reception signal obtained by receiving the wave reflected on the target by a reception means is multiplied by the second pseudo random signal through a second multiplier. When the modulated phase of the reception signal phase-modulated with the first pseudo random signal coincides with the phase of the second pseudo random signal, the result of multiplication obtained as an output from the second multiplier becomes an in-phase carrier and is subject to synchronous detection by a coherent detector means in the succeeding stage. The detection output is further signal processed through a detection signal generation means constituted by a pair of low-pass filters, a pair of squarers and an adder to thereby output a pulse-like target detection signal.

However, the first and second pseudo random signals are equal to each other in the code pattern thereof but slightly different from each other in the frequency of the signal generator means. Accordingly, the phase of the two signals become shifted from each other with the passage of time after phases of the two signals coincide with each other (that is, the correlation output of the two signals takes its maximum value). When the phases of the two signals are shifted from each other by one code length or more, the correlation of the two pseudo random signals is lost. In this condition, the phase of the carrier obtained as a result of multiplication of the receptions signal by the second pseudo random signal becomes random, so that the frequency band is restricted by the low-pass filters after synchronous detection by the coherent detector means in the succeeding stage and it is impossible to obtain a target detection signal.

When the phase difference between the first and second pseudo random signals becomes just equivalent to one period of one pseudo random signal after time is further passed, the phases of the two signals become coincident with each other again. In this condition, the correlation output of the two signals takes its maximum value again so that a pulse-like target detection signal is obtained again through the coherent detector means and the detection signal generator means. Thus, this phenomenon is repeated at regular time intervals so that a cyclic pulse-like signal can be obtained as a target detection signal.

On the other hand, the setting of reference time is necessary for measuring the pointing of time when the target detection signal is obtained from the reception signal. Therefore, a time reference signal for representing the reference time is generated as follows. The first pseudo random signal is directly multiplied by the second pseudo random signal is directly multiplied by the second pseudo random signal through the first multiplier. Then, a time series pattern as a result of the multiplication is picked up through low-pass filter, so that a pulse-like signal having the same period as that of the target detection signal is obtained as the time reference signal.

Accordingly, because the time from the point of time when the time reference signal is generated to the point of time when the target detection signal obtained from the reception signal is generated is proportional to the propagation time taken for the electromagnetic wave to move forth and back between the transmission/reception antenna and the target, the distance between the transmission/reception antenna and the target can be calculated from the time difference between the two signals.

The aforementioned explanation is formulated as follows:

Let f1 be the repetition frequency of the first pseudo random signal. Let f2 be the repetition frequency of the second pseudo random signal. It is now assumed that the patterns of the two pseudo random signals are equal to each other and that f1 is larger than f2.

When the period in which the reference signal obtained on the basis of correlation of the first and second pseudo random signals transmitted takes its maximum is replaced by TB, the different in the number of waves between the first and second pseudo random signals contained in the period TB is equal to the number N of one-period waves. That is, the following equation is obtained.

$$TB \cdot f1 = TB \cdot f2 + N$$

Rearranging the equation, TB is represented by the following equation (1).

$$TB = N/(f1 - f2) \tag{1}$$

This is, the period TB in which the reference signal takes its maximum increases a the difference between the two clock frequencies decreases.

Let $\tau$ be the propagation time from the point of time when the carrier phase-modulated with the first pseudo random signal is transmitted to the point of time when the carrier is received after reflected on the target. Let TD be the time difference between the point of time when the pulse-like signal of the target detection signal obtained by demodulating the reception signal on the basis of the second pseudo random signal and coherently detecting it is generated and the point of time when the pulse-like signal of the reference signal is generated. Because the number of waves of the second pseudo random signal generated in the period TD is smaller by the number of waves of the first pseudo random signal generated in the propagation time $\tau$, than the number of waves of the first pseudo random signal generated in the period TD, the following equation is established.

$$TD \cdot f2 = TD \cdot f1 - \tau \cdot f1$$

Rearranging the equation, TD is represented by the following equation (2).

$$TD = \tau \cdot f1/(f1 - f2) \tag{2}$$

That is, the period TD is measured as a value obtained by elongating the propagation time $\tau$ by f1(f1−f2) times or in other words reducing the measurement speed by f1(f1−f2) times. Such enlargement of the measurement time means that the present invention is essentially suitable for short-distance measurement.

Here, the propagation time $\tau$ is expressed by the equation:

$$\tau = 2x/v$$

in which v represents the propagation speed, and x represents distance to the target.

Accordingly, the following equation (3) is obtained on the basis of the equation (2).

$$x = \frac{f1 - f2}{2f1} \cdot V \cdot TD \tag{3}$$

In short, the distance x can be measured by measuring the time difference TD according to the equation (3).

According to another aspect of the present invention, since a pseudo random/signal generator is constituted by a counter, a storage device, and a signal convertor, any an M-type signal and there pseudo random signal other than an M-type signal, such as a Barker code, or the like, can be used. When, for example, a Barker code is used as a pseudo random signal, the signal reflected on the target can be detected sensitively by a technique of generating a signal intermittently through providing a time interval for each period of the output of the Barker code while changing the signal sensitivity of the radar with the passage of time to mask unnecessary reflected signals temporarily.

According to a further aspect of the invention, the microwave radar uses a technique of suppressing the change of detection signal strength through adjustment of signal strength in the receiver to thereby suppress generation of errors caused by signal saturation and reduction of the signal level. Accordingly, the slag level position in the furnace can be measured accurately even when the strength of the microwave signal reflected on the slag level changes by the change of the slag level in the furnace or the like. Further, by averaging measurement values while neglecting low S/N measurement values, the slag level position in the furnace can be measured more accurately even when the signal level is temporarily reduced by the sudden change of the slag level.

The above and other objects as well as advantageous features of the invention will become clearer from the following description taken in conjunction with the drawings.

DESCRIPTION OF THE PREFERRED EMBODIMENTS

Figure 1:
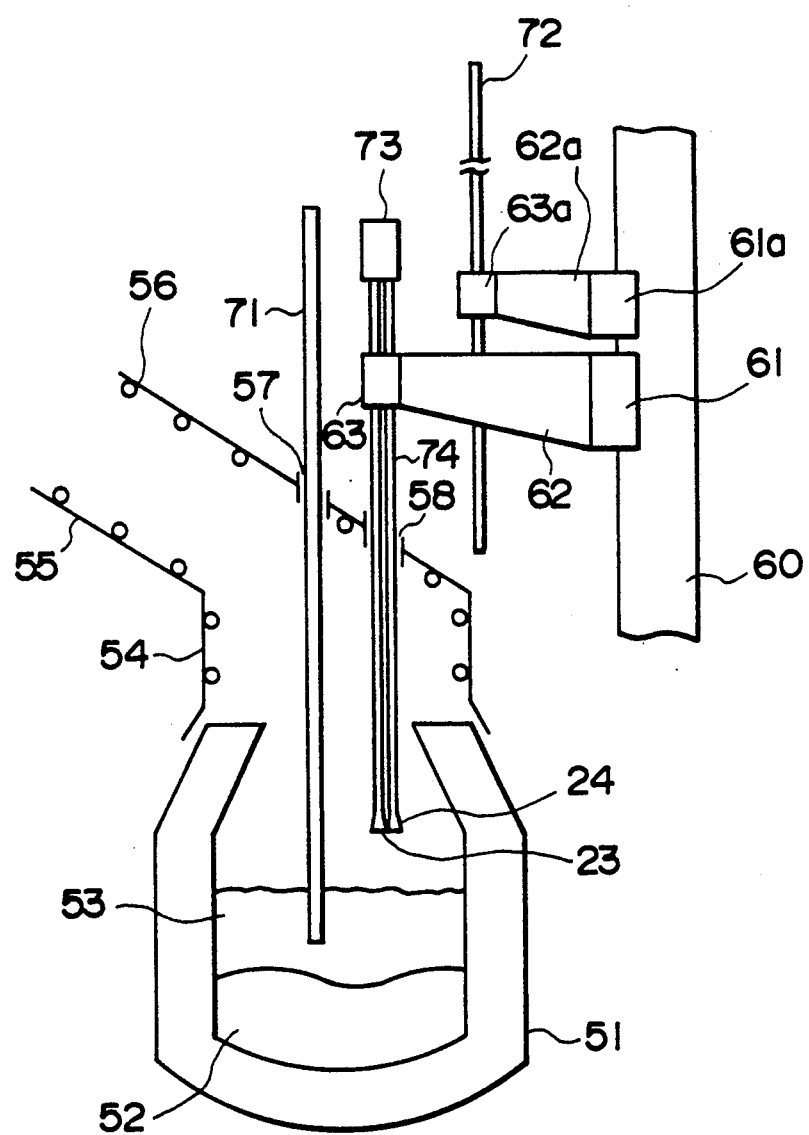
FIG. 1 is a sectional view typically showing embodiment of the present invention.

In a convertor shown in FIG. 1, molten metal 53 and slag 53 are in a convertor body 51. A hood 54 is provided at the upper portion of the convertor body 51. A smoke duct 55 is attached to the hood 54. A boiler piping 56 for recycle exhaust heat is attached to both the inner wall of the hood 54 and the inner wall of the smoke duct 55. Holes 57 and 58 for insertion of a mainlance 71 and a sublance 72 are provided in the hood 54.

As shown in the drawing, a beam 60 is provided near the convertor. A rotator 61 constituted by an electric motor is attached to the beam 60. The rotator 61 is linked with a hinge 62 to rotate it. A lift 63 constituted by an electric motor is attached to an end of the hinge 62.

A microwave radar 73 is connected to transmission and reception antennas 23 and 24 through a waveguide 74 which is supported by the lift 63 so that the vertical position thereof is controlled.

Accordingly, the vertical position of the waveguide 74 is controlled by the lift 63 and the position thereof in a two-dimensional plane is controlled by the rotator 61.

The mechanism for supporting the sublance 72 is the same as that for supporting the waveguide. That is, a rotator 61a is attached to the beam 62 and linked with a hinge 62a to rotate it. A lift 63a is attached to an end of the hinge 62a, so that the sublance 72 is supported by the lift 63a to control the vertical position thereof.

Figure 3:
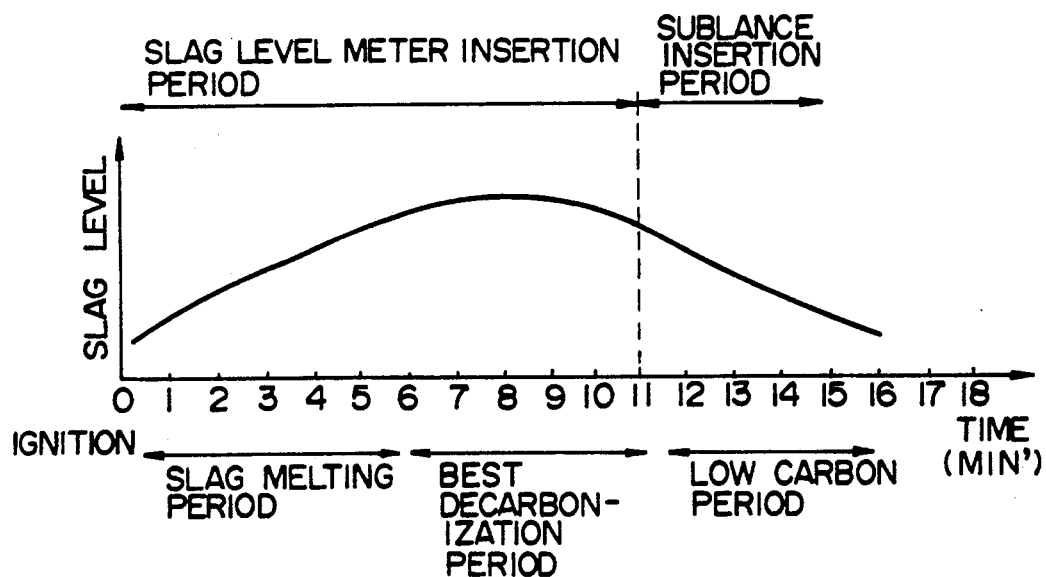
FIG. 3 is a diagram for explaining the application period of the slag level meter according to the present invention.

In the following, a technique for alternately inserting the sublance 72 and the antennas 23, 24 into the furnace is described. From ignition to the best carbonization period through the slag melting period, the antennas 23 and 24 of the microwave radar 73 are inserted into the convertor to measure the slag level to thereby predict slopping. Thereafter, in the low carbon period, the sublance 72 is inserted into the furnace to perform molten metal temperature measurement and sampling. That is, as shown in FIG. 3, there is a risk of slopping caused by an abnormal reaction in the slag melting period of about 6 minutes after ignition. In the best decarbonization period after that, there is a risk of slopping because the slag level is relatively high. Therefore, in the case where the measured slag level increases suddenly or in the case where the measured slag level is higher than a predetermined point, an anti-foaming agent such as coke breeze, limestone, etc. is put into the furnace. After about 11 minutes from ignition, the refining procedure goes to the low carbon period. In the low carbon period, there is no risk of slopping because the slag level is relatively low and stable. However, there is the necessity of sampling for molten metal temperature measurement and molten metal composition adjustment in the last stage of the refining procedure. Therefore, the sublance 72 is inserted into the furnace.

Figure 2:
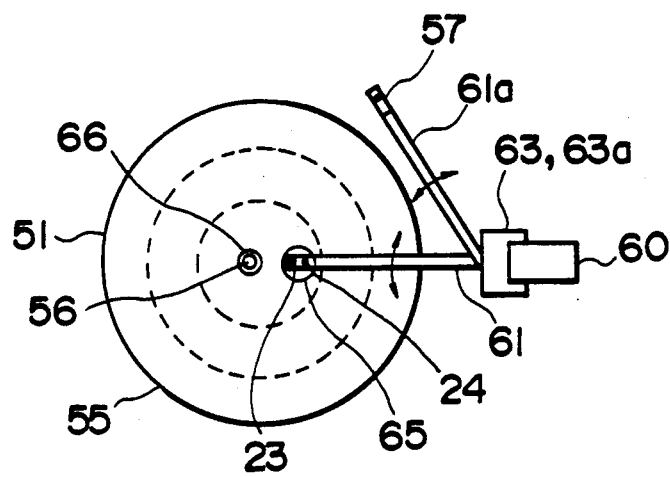
FIG. 2 is a plan view of FIG. 1.

In the embodiment shown in FIGS. 1 and 2, it has been found that the slopping rate is reduced from about 9% to 1% or less.

In the following, the operation for alternating the sublance 72 and the antennas 23, 24 in the mechanism as shown in FIGS. 1 and 2 is described.

FIGS. 1 and 2 show the state where the antennas 23 and 24 are inserted into the convertor in the refining procedure to measure the level of the slag 53. To attain this state, the lift 63 is adjusted to the hole 58 of the hood 54 by rotating the rotator 61 under the condition that the antennas 23 and 24 are elevated up. Then, the antennas 23 and 24 are inserted into the convertor through the hole 58 by dropping down the waveguide 74 by operating the lift 63. When the distance between the antennas and the slag surface takes a predetermined value, the dropping of the waveguide 74 is stopped. At the same time, as shown in the drawing, the sublance 72 is retreated by operating the lift 63a and the rotator 61a.

Under the aforementioned condition, the level of the slag 53 is measured by the microwave radar 73. The construction and function of the microwaver radar 73 will be described later.

Because the sublance 72 must be inserted into the convertor at the last stage of the refining procedure as described above, the antennas 23 and 24 are retreated and at the same time the sublance 72 is inserted into the furnace. The operation at this time is as follows. The antennas 23 and 24 are elevated up out of the hole 58 of the hood 54 by operating the lift 63 and then the antennas 23 and 24 are moved to a suitable position in a two dimensional plane by the rotator 61.

After the antennas 23 and 24 are retreated as described above, the lift 63a is adjusted to the hole 58 of the hood 54 by operating the rotator 61a. Then, the sublance 72 is dropped by operating the lift 63a so as to be inserted into the convertor through the hole 58. The dropping of the sublance 72 is stopped when the distance between the sublance 72 and the surface of the slag 53 takes a suitable value.

Although the above description has been made upon the case where the retreat of the antennas 23 and 24 and the insertion of the sublance 72 are made in time sequence, the invention can be applied to the case where the retreat of the antennas 23 and 24 and the insertion of the lance 72 are made so synchronously as to be free from collusion to thereby smoothen the alternating operation more. The modified technique in the latter case can be applied to the retreat of the lance 72 and the insertion of the antennas 23 and 24.

In the following, the construction and operation of the microwave radar 3 are described more in detail.

Figure 4:
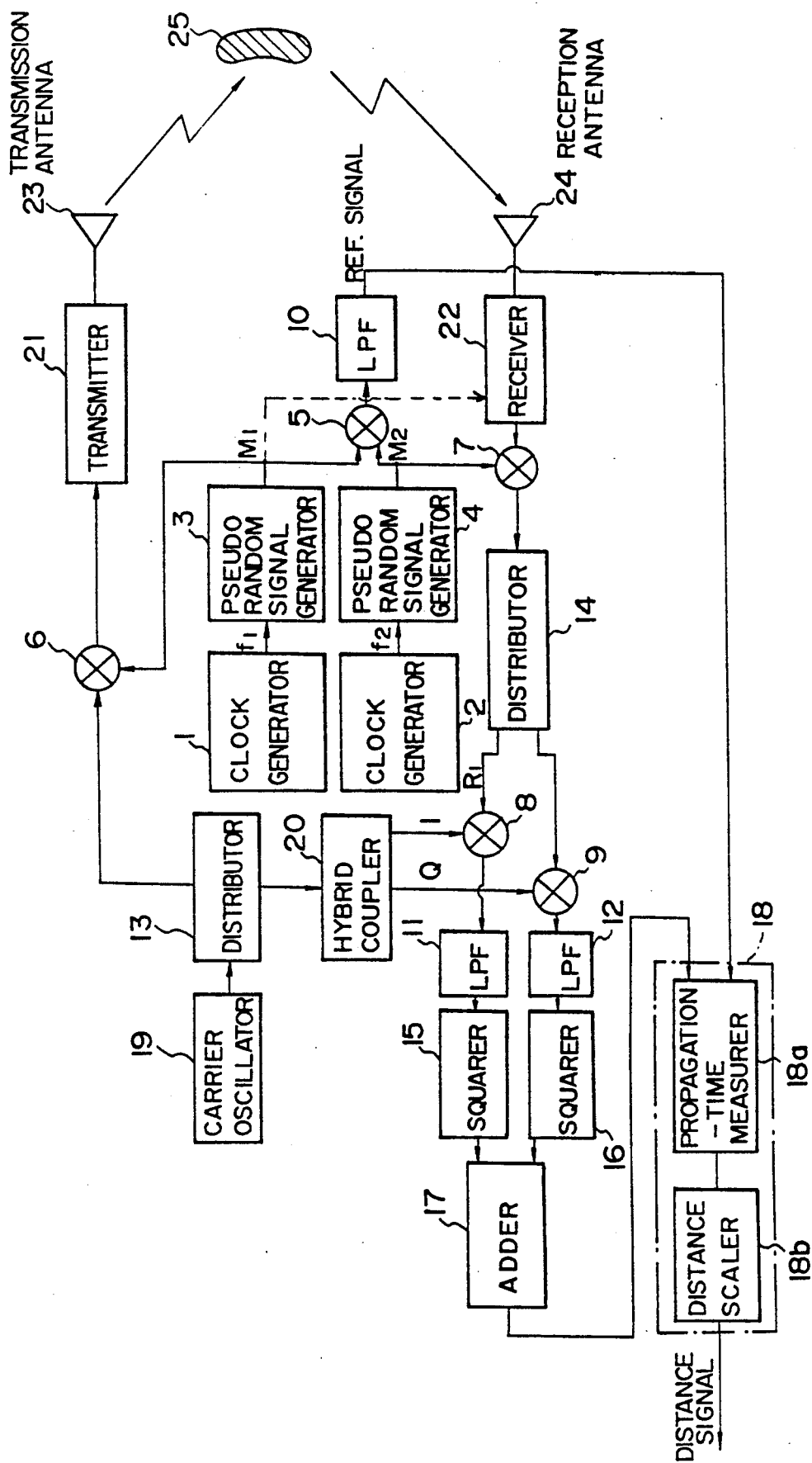
FIG. 4 is a block diagram showing the configuration of a microwave radar to be applied to the in-furnace level meter according to the invention.

In a microwave radar 73 in an embodiment of the invention depicted in FIG. 4, the reference numerals 1 and 2 designate clock generators respectively, and 3 and 4 designate pseudo random signal generators respectively. The reference numerals 5 through 9 designate multipliers, for example, constituted by double-balanced mixers respectively. The reference numerals 10 through 12 designate low-pass filters respectively, 13 and 14 designate distributors respectively, 15 and 16 designate squarers respectively, 17 designates an adder, 18 designates a time measurer, 19 designates a carrier oscillator, 20 designates a hybridcoupler, 21 designates a transmitter, 22 designates a receiver, 23 designates a transmission antenna, 24 designates a reception antenna and 25 designates a target (slag surface in the furnace).

Figure 5:
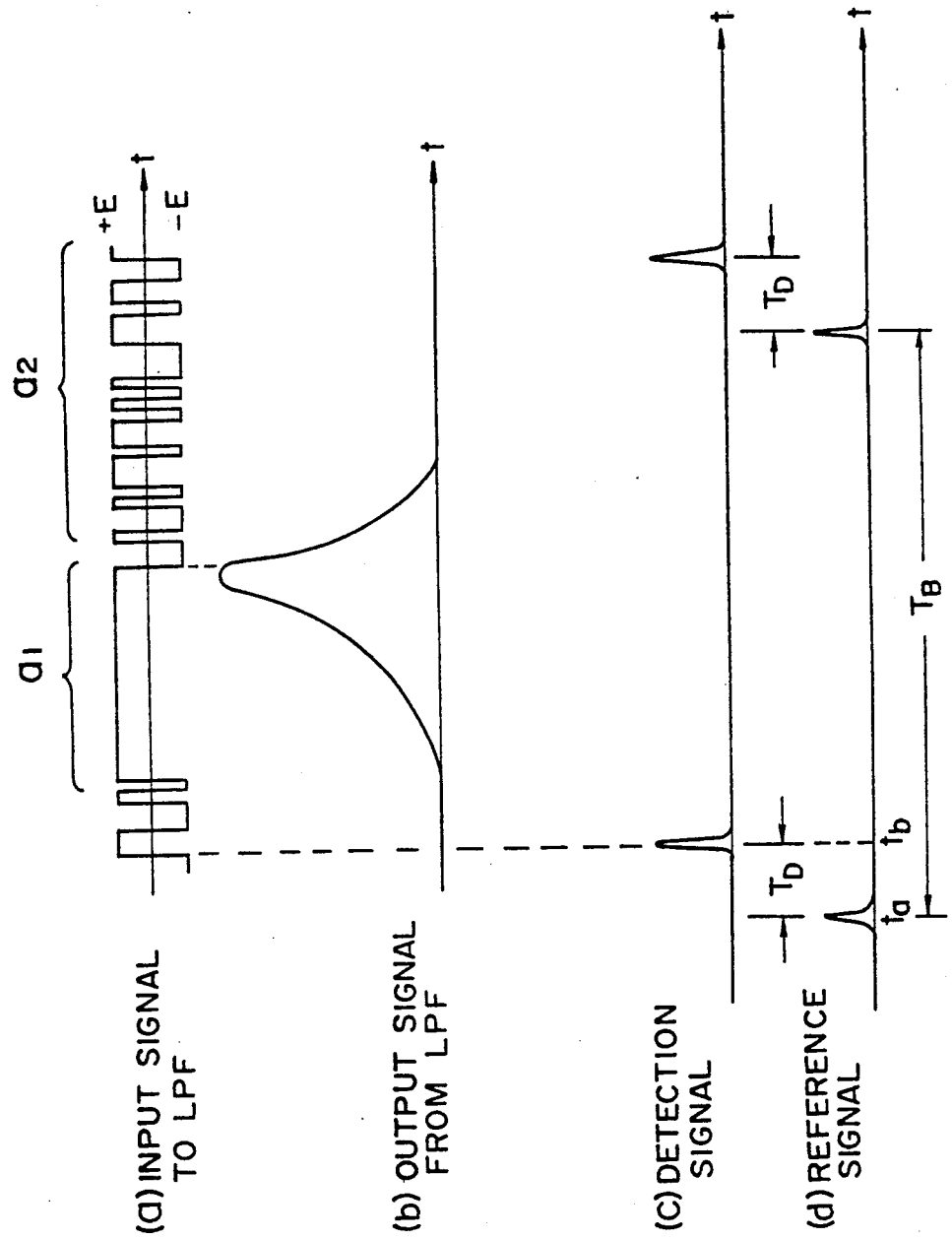
FIG. 5 shows waveforms for explaining the operation of the microwave radar depicted in FIG. 1.
Figure 6:
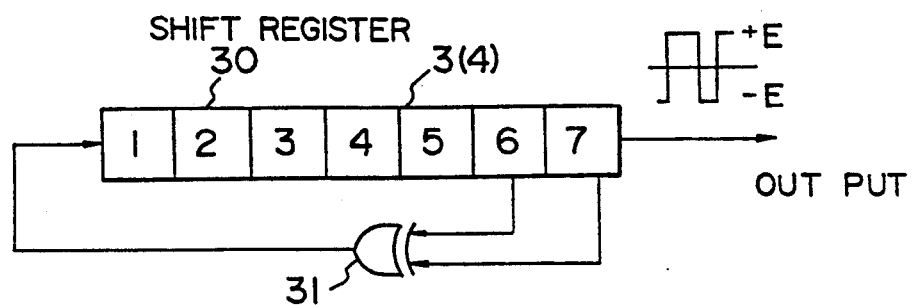
FIG. 6 is a view showing the configuration of the 7-bit M-type signal generator.

Referring to the respective timing charts of the diagrams (a) through (d) of FIG. 5, the operation of the apparatus of FIG. 4 will be described. For example, each of the pseudo random signal generators 3 and 4 may be constituted by an M-type signal generator. The M-type signal generator may be a 7-bit M-type signal generator. The M-type signal generator may be a 7-bit M-type signal generator constituted by a shift register 30 of a 7-stage structure and an exclusive OR circuit 31, as shown in FIG. 6, the shift register 30 being of a 7-stage structure composed, for example, of ECL (emitter-coupled logic) elements. The M-type signal is a periodically circulating signal having a combination of codes "1"(corresponding to a positive voltage +E). and "0"(corresponding to a negative voltage −E). In this embodiment of 7 bits, on the period is completed when 127 ($=2^7-1$) signals (also called 127 signal-chips) are generated. Accordingly, in this embodiment, a circulating signal repeating this period is generated.

The pseudo random signal generators 3 and 4 are constituted by the same circuits, so that the output signals of the pseudo random signal generators 3 and 4 have the same pattern. However, the pseudo random signal generators 3 and 4 are slightly different in clock frequency supplied thereto, so that they are slightly different in one period thereof. Other than the M-type signal, a Gold-type signal or a JPL-type signal may be used as a pseudo random signal.

Each of the clock generators 1 and 2 includes a quartz oscillator by which a clock signal sufficiently stable in frequency is generated. However, the clock generators 1 and 2 are slightly different in the frequency generated. In this embodiment, the frequencies f1 and f2 generated by the clock generators 1 and 2 are 100.004 MHz and 99.996 MHz, respectively, so that the difference f1−f2 between the frequencies is 8 KHz.

The clock signals f1 and f2 respectively generated from the clock generators 1 and 2 are respectively supplied to the pseudo random signal generators 3 and 4. The pseudo random signal generators 3 and 4 generate M-type signals M1 and M2 slightly different in one period thereof but of the same pattern, on the basis of the difference in frequency between the driving clock signals. Here, the respective periods of the two M-type signals M2 and M2 can be calculated as follows.

(Period of M1)$=127\times 1/100.004$ MHz$\approx 1269.9492$ ns (Period of M2)$=127\times 1/99.996$ MHz$\approx 1270.0508$ ns Accordingly, the two M-type signals M1 and M2 have the substantially the same period of about 1270 ns ($10^{-9}$ sec) but have a time difference of about 0.1 ns. Therefore, if the two M-type signals M1 and M2 are circulatedly generated and then the patterns of the two M-type signals are matched with each other at a certain point of time ta, a time difference of 0.1 ns arises between the two signals whenever one period is passed, or in other words, a time difference of 10 ns arises between the two signals when 100 periods are passed.

Because the M-type signal has 127 signal-chips generated in a period of 1270 ns, the time required for generating one signal-chip is 10 ns. Accordingly, the fact that a time difference of 10 ns arises between the two M-type signals M1 and M2 represents the fact that the M-type signals are diverged by one signal-chip from each other. The output M1 of the pseudo random signal generator 3 is supplied to the multipliers 5 and 6. The output M2 of the pseudo random signal generator 4 is supplied to the multipliers 5 and 7.

For example, the carrier oscillator 19 generates a microwave having a frequency of about 17 GHz. The output signal of the carrier generator 19 is distributed, by the distributor 13, into the multiplier 6 and the hybrid coupler 20. For example, the multiplier 6 is constituted by a double-balanced mixer. The multiplier 6 multiplies the carrier of about 17 GHz fed from the distributor 13 by the M-type signal M1 fed from the pseudo random signal generator 3 and feeds the transmitter 21 with a spectrum diffused signal formed by phase-modulating the carrier.

The transmitter 21 power-amplifies the input spectrum-diffused signal, converts it into an electromagnetic wave through the transmission antenna and radiates it toward the target 25. Because the wavelength of the electromagnetic wave having a frequency of 17 GHz is 1.3 cm in air and is sufficiently larger than the size (diameter) of dust in an iron-manufacturing furnace, there is little influence of dust or the like. For example, each of the transmission antenna 23 and the reception antenna 24 is constituted by a horn antenna to narrow down the directivity sharply to thereby reduce electric power reflected on matters other than the target, as sufficiently as possible for example, each of the transmission antenna 23 and the reception antenna 24 has an antenna gain of about 20 dB.

The electromagnetic wave radiated from the transmission antenna 23 toward the target 25 (corresponding to the slag 53 of FIG. 1) is reflected on the target 25, converted into an electric signal through the reception antenna 24 and fed to the receiver 22. Of course, the point of time when the input signal is supplied to the receiver 22 is delayed from the point of time when the electromagnetic wave is radiated from the transmission antenna 23 by the propagation time of the electromagnetic wave which is taken for the electromagnetic propagates forward from the transmission antenna 23 to the target 25 and then propagates back from the target 25 to the reception antenna 24. The receiver 22 amplifies the input signal and feeds the amplified signal to the multiplier 7.

On the other hand, the M-type signals M1 and M2 respectively fed from the pseudo random signal generators 3 and 4 to the multiplier 5 are multiplied by each other. The time series signal representing the multiplication value is supplied to the low-pass filter 10. The input signal the low-pass filter 10, that is, the time series signal representing the output value of the multiplier 5, has a waveform as shown in the diagram (a) of FIG. 5. In the time region a1 in which the phases of the two pseudo random signals fed to the multiplier 5 are matched with each other, an output voltage +E is continued. In the time region a2 in which the phases of the two signals are not matched with each other, an output voltage +E and an output voltage −E are produced at random.

The low-pass filters 10 through 12 have a kind of integral function based on the band limitation for frequency. Accordingly, when the phases of the two signals are matched with each other, the output signal from the low-pass filters 10 through 12 as a signal formed by integrating correlative operation values of the two signals is a pulse-like signal as shown in the diagram (b) of FIG. 5. When the phases of the two signals are not matched with each other, the output signal from the low-pass filters has a value of 0. Therefore, a periodic pulse-like signal is produced in the output of the low-pass filter 10. The pulse-like signal as a reference signal for time is supplied to the time measurer 18. In this embodiment, the period TB of the reference signal calculated on the basis of the aforementioned equation (1) is 15.875 ms, because f1 and f2 are 100.004 MHz and 99.996 MHz, respectively. The reference signal and the period TB thereof are shown in the diagram (d) of FIG. 5.

The reception signal from the receiver 22 and the M-type signal M2 from the pseudo random signal generator 4 are fed to the multiplier 7 and multiplied by each other. When the modulated phase of the reception signal formed by phase-modulating the transmission carrier on the basis of the first M-type signal M1 is matched with the phase of the second M-type signal M2, the multiplication result from the multiplier 7 as a matched-phase carrier signal is supplied to the distributor 14. When the modulated phase of the reception signal is not matched with the phase of the M-type signal M2, the multiplication result from the multiplier 7 as a random-phase carrier signal is supplied to the distributor 14. The distributor 14 distributes the input signal into the two multipliers 8 and 9, that is, the two output signals R1 and R from the distributor 14 are supplied to the multipliers 8 and 9, respectively.

The hybrid coupler 20 supplied with a part of the transmission carrier from the distributor 13 supplies the multipliers 8 and 9 with an in-phase (zero-phase) component signal I having the same phase as the phase of the input signal and a quadrature (90° -phase) component signal Q having a phase perpendicular to the phase of the input signal, respectively. The multiplier 8 multiplies the signal I (that is, the signal having the same phase as that of the output from the carrier oscillator 19) fed from the hybrid coupler 20 and the aforementioned signal R1 fed from the distributor 14 by each other. Similarly to this, the multiplies 9 multiplies the input signal Q (that is, signal having a phase shifted by 90 degrees from the output of the carrier oscillator 19) and the aforementioned signal R2 by each other. Accordingly, the multipliers 8 and 9 respectively extract a zero-phase component (I·R1) and a 90°-phase component (Q·R2) from the reception signal and send out the two components as detected signals.

The signals I·R1 and Q·R2 as detected signals are supplied to the low-pass filters 11 and 12, respectively.

The low-pass filters 11 and 12 have an integral function based on band limitation of frequency. By the integral function, the low-pass filters 11 and 12 integrate correlative operation values of the two signals. That is, when the phase of the aforementioned signal R1 fed from the multiplier 7 to the multiplier 8 through the distributor 14 is matched with the phase of the aforementioned signal I fed from the hybrid coupler 20 to the multiplier 8 and when the aforementioned signal R2 fed to the multiplier 9 is matched with the signal Q fed to the multiplier 9, the output signals from the multipliers 8 and 9 become pulse signals of predetermined polarity (the voltage +E or the voltage −E) so that large voltage arise in the outputs of the low-pass filters 11 and 12 integrating the signals, respectively.

When the phase of the aforementioned signal R1 is not matched with the phase of the signal I and when the aforementioned signal R2 is not matched with the phase of the signal Q, the output signals from the multipliers 8 and 9 become pulse signals of randomly changed polarity (that is, the voltage +E and the voltage −E) so that zero voltage arises in the outputs of the low-pass filters 11 and 12 integrating the signals, respectively.

The zero-phase and 90°-phase components thus subjected to the integral processing through the low-pass filters 11 and 12 are supplied to the squarers 15 and 16, respectively. The squarers 15 and 16 respectively square the amplitudes of the input signals and feed the output signals as operation results to the adder 17. The adder 17 adds the two input signals to each other and supplies a pulse-like detection signal as shown in the diagram (c) of FIG. 5 to the time measurer 18.

It is now assumed that the point of time when the detection signal takes its maximum is tb. The aforementioned technique having the steps of detecting zero-phase and 90° -phase components of transmission carrier respectively from a signal formed by the correlation processing of the reception signal and the M-type signal M2, integrating the detection signals and then squaring the integrated signals respectively, and adding the pair of squared values to each other to obtain a target detection signal, is more or less complex in configuration but can obtain a high-sensitive target detection signal. As the correlative output of the pseudo random signal such as an M-type signal can be obtained, a high S/N Measuring system to reduce the influence of noise for the purpose of signal emphasis can be provided. Of course, a detection technique using crystal may be employed according to the specification and cost because the technique is inferior in sensitivity but simple in configuration.

The time measurer 18 is composed of a propagation-time measurer 18a and a distance scaler 18b. The propagation-time measurer 18a measures the time TD between the point of time ta when the reference signal fed from the low-pass filter 10 takes its maximum and the point of time when the detection signal fed from the adder 10 takes its maximum and the point of time when the detection signal fed from the adder 17 takes its maximum. Therefore, the propagation-time measurer 18a has a function for detecting the time points when the two input signals respectively take the maximum value. For example, the time point when an input signal takes its maximum value can be detected by detecting the time point of turning-over of the input signal (from increase to decrease for time) while temporarily comparing the present sample value and the previous sample value successively obtained by sample-holding of the input voltage value on the basis of the clock signal. The time TD represents a time between the time point ta of generation of the maximum value of the reference signal as shown in the diagram (d) of FIG. 5 and the time point tb of generation of the maximum value of the detection signal as shown in the diagram (c) of FIG. 5. As shown in the aforementioned equation (2), the time TD can be calculated by increasing the propagation time $\tau$ required for the electromagnetic wave actually moving forth and back as to the distance between the transmission and reception antennas 23 and 24 and the target 25 by $f1/(f1-f2)$ times. In this embodiment, the following equation (4) is obtained by increasing the time by 12,500 times, because $f1=100.004$ MHz and $f2=99.996$ MHz.

$$TD = 12,500\tau \quad (4)$$

The time TD as expressed by the equation (4) is obtained for each period TB of the reference signal.

Because the measurement time in the invention is enlarged very greatly, the distance to the target can be measured with high accuracy. Accordingly, it may be said that the measurement apparatus according to the invention is suitable to a level meter for measuring short distance such as in-furnace slag level, melt level, etc.

Accordingly, the distance x (meter) from the transmission and reception antennas 23 and 24 to the target 25 is represented by the following equation (5) when it is calculated according to the equation (4).

$$x = (f1-f2)/2f1 \cdot v \cdot TD = 1.2 \times 10_4 \cdot TD \quad (5)$$

The operation expressed by the equation (5) is carried out by the distance scaler 18b to generate a distance signal and a slag level measurement signal is obtained on the basis of the distance signal.

Although the transmission and reception antennas 23 and 24 may be provided as a single one to be commonly used, they were provided separately in this embodiment for the purpose of reduction of interference in the signal system. Each antenna was made to be a small-sized one having a diameter of 100 mm so that the antenna could be inserted/removed through the small hole 58 of 270 mm diameter formed in the hood 54.

By the use of the slag level meter by means of the microwave radar of the above-mentioned embodiment, the slag level in the convertor could be measured with precision of 100 mm and response speed of 3 seconds.

Figure 7:
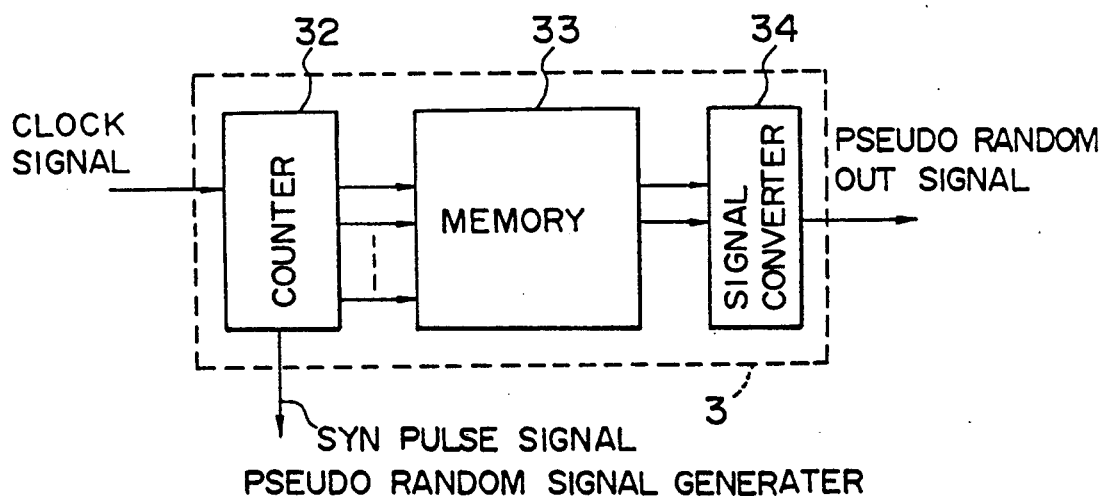
FIG. 7 is a block diagram showing another example of the configuration of the pseudo random signal generator.

Each of the microwave radar pseudo random signal generators 3 and 4 in FIG. 4 may have a configuration as shown in FIG. 6 or may have a configuration as shown in FIG. 7.

The psuedo random signal generator as shown in FIG. 7 is composed of a counter 32, a storage device 33, and a signal convertor 34.

The counter 32 receives a clock signal as an input signal, counts the input clock pulses and feeds the count value of clock pulses to the storage device 33. The counter 32 carries out a counting operation from 0 to a count upper-limit value n. When the count reaches to the upper-limit value n, the counter is reset to 0 and then restarts the counting operation. In this embodiment, the upper-limit value is 127, so that the counter 32 repeats the counting operation from 0 to 127 in synchronism with the fed clock signal. When the counter is reset to 0, a synchronizing pulse signal is sent out to the outside.

The storage device 33 has a memory for storing data, constituted by an ROM, and RAM, etc. The storage device 33 receives the output count value from the counter 32, reads code date of the pseudo random signal stored in the memory while using the count as an address of the memory and feeds the data to the signal convertor 34. In this embodiment, the storage device 33 has a capacity for 128 data of the data length of 2 bits designated by addresses of from 0 to 128. The first bit of the respective data in memory represents the code pattern of the pseudo random signal to be stored. Accordingly, the first bit is set to "1" or "0" corresponding to the code "1" or "0" of the pseudo random signal. The second bit of the respective data in memory represents a judgment as to whether the data in memory is a code data of the pseudo random signal or not. When the data in memory is a code data, the second bit is set to "1". When the data in memory is not a code data, the second bit is set to "0".

Figures 8, 9, 10:
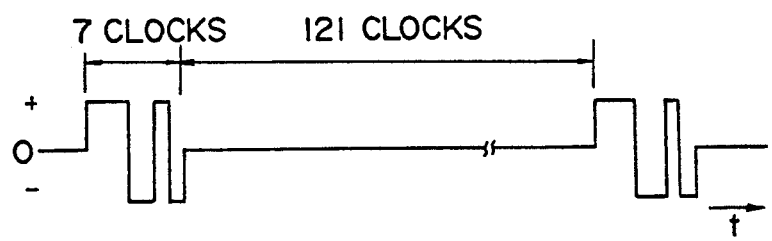
FIG. 8 is a view showing an example of data in the storage device depicted in FIG. 4.
FIG. 9 is a view showing the relationship between the input data and output signal of the signal convertor depicted in FIG. 4.
FIG. 10 is a view of a waveform of the signal convertor.

FIG. 8 shows an example of a table in the case where a Barker code data of code length 7 are stored in the memory of the storage device 33. In this example, 2-bit data represented by "11" and "10" corresponding to the Barker code data are stored in address 0 through 6 of the memory and, at the same time, 2-bit data represented by "00" are stored in the other addresses 7 through 127 of the memory. Because data corresponding to the addresses 0 through 127 are successively read out on the basis of the input signal fed from the counter 32, the data reading operation in the storage device 33 is repeated in a period of 128 clock pulses in synchronism with the clock signal fed to the counter 32.

A table of FIG. 9 shows the relationship between the input data and the output signal in the signal convertor 34 in this embodiment. The signal convertor 34 receives data from the storage device 33, converts the data into a three-value signal and sends out it. That is, when the 2-bit data fed from the storage device 33 in "11" or "10" as representing a code data, the signal convertor 34 generates a positive (+) or negative (−) signal corresponding to the data. When the 2-bit data is "00" or "01", the signal convertor 34 generates a zero signal.

FIG. 10 shows to the waveform of the output signal from the signal convertor 34, that is, the waveform of the output signal from the pseudo random signal generator, in the case where data are fed from the storage device 33 having such memory content as shown in FIG. 8. In respect to the output waveform, a positive (+), negative (−) zero (0) signal is sent out correspondingly to the data read from the storage device 33. Because the operation of reading data from the storage device 33 is repeated in a period determined by the number of memory addresses in the storage device 33 in synchronism with the clock signal, the output signal from the signal convertor 34 has a waveform formed by repeating 7-clock-pulses Barker' code output signals and 121-clock-pulses' zero signals.

The operation of the microwave radar will be described below in the case where the pseudo random signal generator in FIG. 7 is applied to the microwave radar in FIG. 4. As the operation in FIG. 4 is substantially equal to the operation in FIG. 4, the operation will be described as to the different portion.

In this embodiment, clock signals of 30.002 MHz and 29.998 MHz and a carrier signal frequency of 10 GHz are used. Each of the pseudo random generators 3 and 4 has a structure as shown in FIG. 7. Barker codes having a code length of 7 and a zero signal having a predetermined duration are repeatedly generated in synchronism with the clock signal.

In this embodiment, the multiplier (modulator) 6 performs modulation of a carrier fed from the carrier oscillator 19 through the distributor 13 on the basis of the pseudo random signal fed from the pseudo random signal generator 3. Here, the signal output from the pseudo random signal generator 3 is a three-value signal +, − or 0. When the signal is + or −, phase-modulation is carried out correspondingly to the signal. When the signal is 0, the carrier output is stopped. As a result, the signal transmitted from the microwave radar to the target through the transmission antenna 23 becomes an intermittent signal.

In this embodiment, the receiver 22 used in the microwave radar receives, through the reception antenna 24, the signal reflected on the target, and performs the amplification or attenuation on the detection signal. That is, the receiver 22 is supplied with a synchronizing pulse signal from the pseudo random signal generator 3 as shown by a broken line in FIG. 4, so that the receiver 22 amplifies/attenuates the reflection signal while changing the factor of amplification or attenuation in synchronism with the synchronizing pulse signal and sends out the detection signal thus amplified/attenuated.

Figure 11:
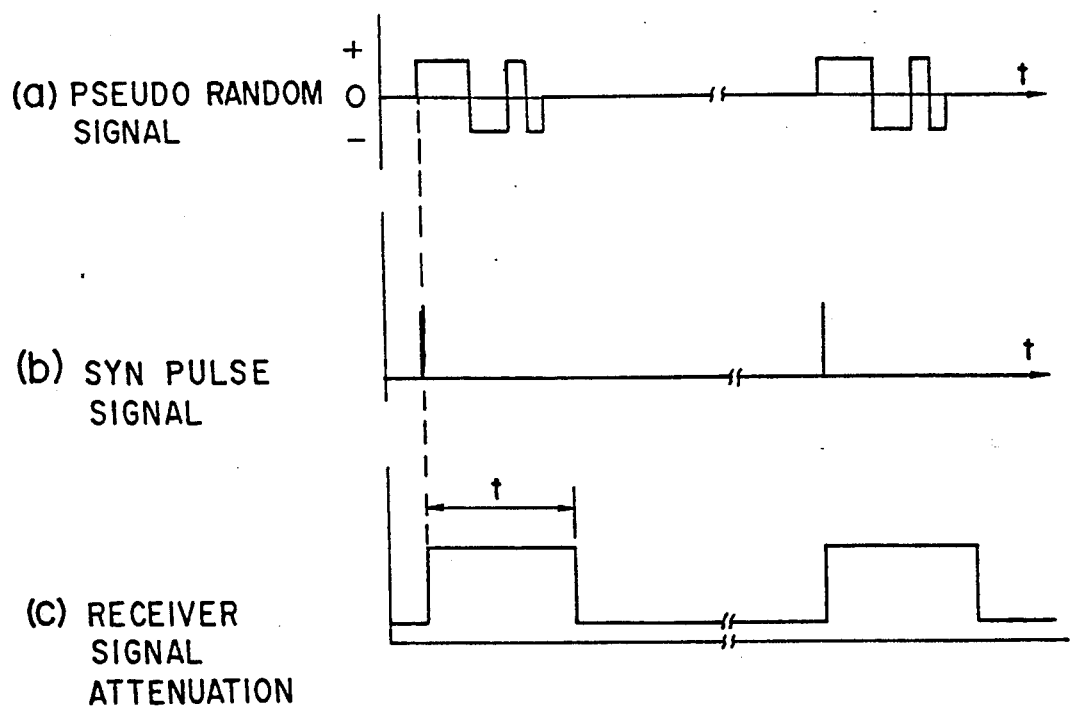
FIG. 11 is a timing chart showing the operation of the receiver in the distance measurer depicted in FIG. 1.

In the timing charts showing the operation of the receiver 22 in FIG. 11, the diagrams (a) and (b) of FIG. 11 respectively show the waveforms of the pseudo random signal and the synchronizing pulse signal as output signals from the pseudo random signal generator 3. The diagram (c) of FIG. 11 shows the time change of the signal amplification factor in the receiver 22. When the receiver 22 receives the synchronizing pulse signal from the pseudo random signal generator 3, the receiver 22 increases the signal attenuation, factor for an arbitrary time t after the pulse-inputting instant to restrict the inputting of an unnecessary reflected signal received at the reception antenna 24 in the time to thereby suppress the influence of the unnecessary reflected signal.

Figure 12:
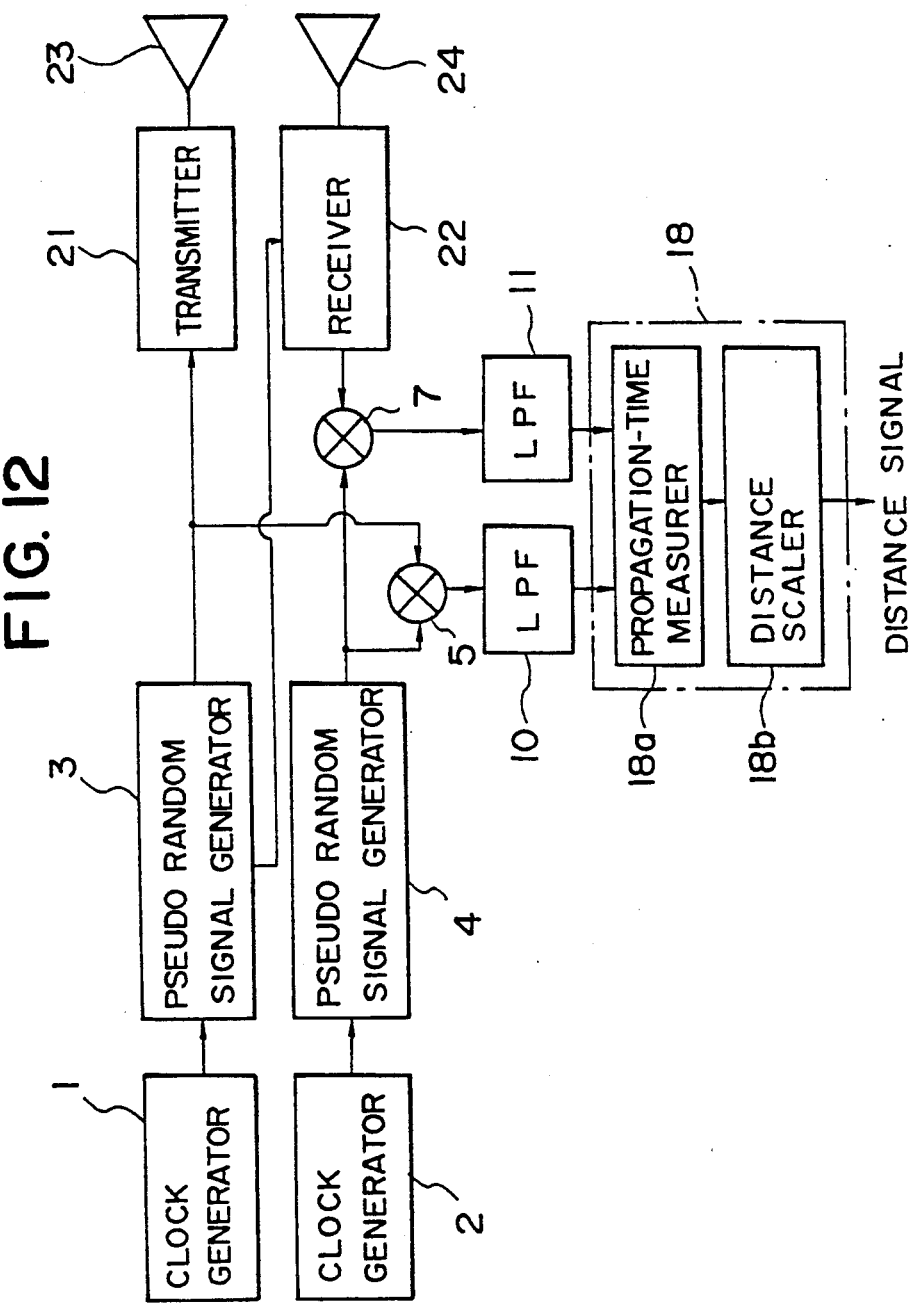
FIG. 12 is a block diagram showing another embodiment of the configuration of the microwave radar in the invention.

In the microwave radar as another embodiment shown in FIG. 12, the pseudo random signal generator as shown in FIG. 6 or the pseudo random signal generator as shown in FIG. 7 is used and the pseudo random signal is directly used as a transmission signal.

Also in this embodiment, the pseudo random signal processing using two pseudo random signals having the same pattern but having slightly different frequencies is employed similarly to the aforementioned embodiment in FIG. 4. That is, in this embodiment, clock signals of 30.002 MHz and 29.998 MHz are used. Here, each of the pseudo random signal generators 3 and 4 has a structure as shown in FIG. 7 and performs generation of Barker codes having a code length of 7.

The pseudo random signal from the pseudo random signal generator 3 is fed to the transmitter 21. The pseudo random signal fed to the transmitter 21 is power-amplified and then converted into an electro magnetic wave through the transmission antenna 23. The electromagnetic wave is radiated toward the target. Therefore, the microwave radar of FIG. 12 has a structure in which the carrier oscillator 19, the distributor 13 and the multiplier 6 in FIG. 4 are omitted.

Further, the electromagnetic wave from the transmission antenna 23 is reflected on the target and converted into an electric signal through the reception antenna 24. Then, the electric signal is fed to the receiver 22. Thereafter, the reception signal from the receiver 22 and the pseudo random signal from the pseudo random signal generator 4 are multiplied (mixed) by each other by the multiplier (mixer) 7. The multiplication result is fed to the low-pass filter 11. Accordingly, the distributor 14, the multipliers 8 and 9, the low-pass filter 12, the squarers 15 and 16, the adder 17 and the hybrid coupler 20 depicted in FIG. 4 are omitted in the configuration of this embodiment.

The output from the low-pass filter 10 and the output from the low-pass filter 11 are fed to the propagation-time measurer 18a and then processed in the same manner as in the case of FIG. 4 to send out the slag level measurement signal from the distance scaler 18b.

In the measuring environment of a narrow space such as the inside space of a furnace in which unnecessary reflected wave will be produced easily, the detection signal based on the necessary reflected wave can be picked up through a time gating circuit by utilizing the advantage that the time for measurement of the distance to the target by the microwave radar is enlarged. Or in other words, the other detection signal based on the unnecessary reflected wave can be removed, so that the level position or the distance can be measured stably.

Although the aforementioned embodiments have shown the case where two antennas are respectively used as a transmission antenna and a reception antenna, it is a matter of course that the invention is not limited thereto and that the invention can be applied to the case where a single antenna may be used commonly to transmission and reception. In this case, a technique of separating a transmission signal and a reception signal by using a direction coupler or by using a transmission/reception changeover switch is used in the antenna system.

Although the aforementioned embodiments have shown the case where a microwave of about 10 GHz is used as a carrier, it is a matter of course that the invention can be applied not only to the case where an electro magnetic wave of an extremely high frequency (EHF), or the like is used as a carrier but to the case where an electromagnetic wave such as light, an acoustic wave, an ultrasonic wave, or the like, is used as a carrier.

Further, the velocity of the target can be measured by additionally providing a timer into the aforementioned microwave radar to calculate the change of the measured distance to the target in unit time.

No only the microwave radar in this embodiment can be used for an in-furnace level meter which will be described later, but it can be used for measurment of the position of a target buried in the ground or in the water or for probing in the ground or the like. Furthermore, the microwave radar can be sufficiently used for measurement of the relatively large distance to a general target such as a flying matter, a ship, a car, etc., or for measurement of the position thereof if clock frequencies for generating two pseudo random signals are set suitably.

In the in-furnace slag level meter in the aforementioned embodiment, the distance between the antenna and the in-furnace slag level is calculated on the basis of the time distance between the pulse peak of the detection signal and the pulse peak of the time reference signal, by which a good result can be attained. Further, the accuracy in measurement can be improved more by inputting the reflected signal into the microwave radar 52 after adjusting the strength of the reflected signal substantially to a predetermined level.

Figure 13:
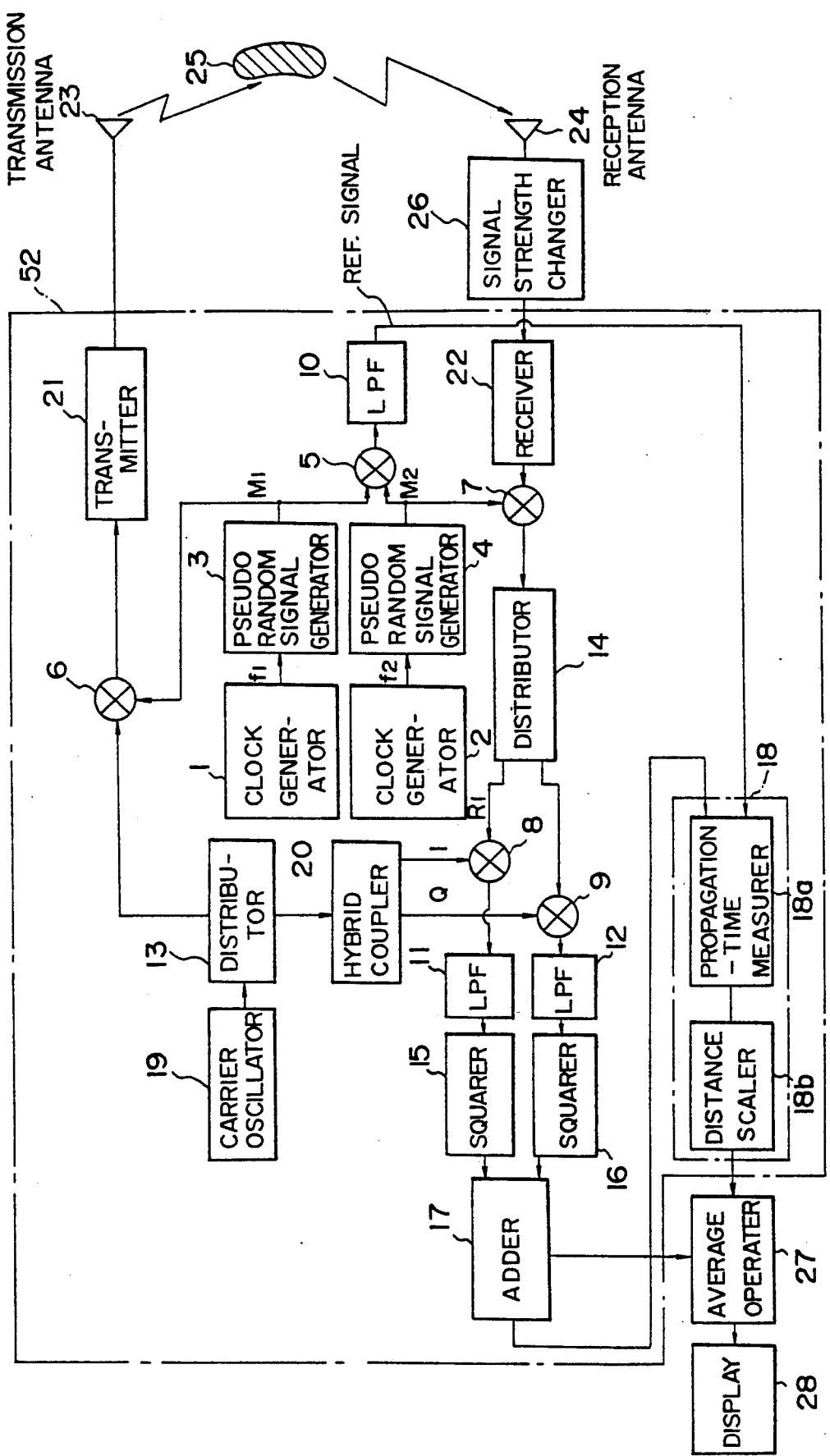
FIG. 13 is a block diagram showing a further embodiment of the configuration of the microwave radar in the invention.

FIG. 13 shows an embodiment in which the microwave radar is constructed so that the strength of the reflected signal can be adjusted. In this apparatus, a signal strength changer 26, an average operation means 27 and a CRT displaying 28 are added to the apparatus of FIG. 4.

Although this embodiment shows the case where the signal strength changer 26 is provided between the reception end of the microwave radar 52 and the reception antenna 24 inserted in the furnace, the invention can be applied to the case where it maybe provided between the transmission end of the microwave radar 52 and the transmission antenna 23.

Figure 14:
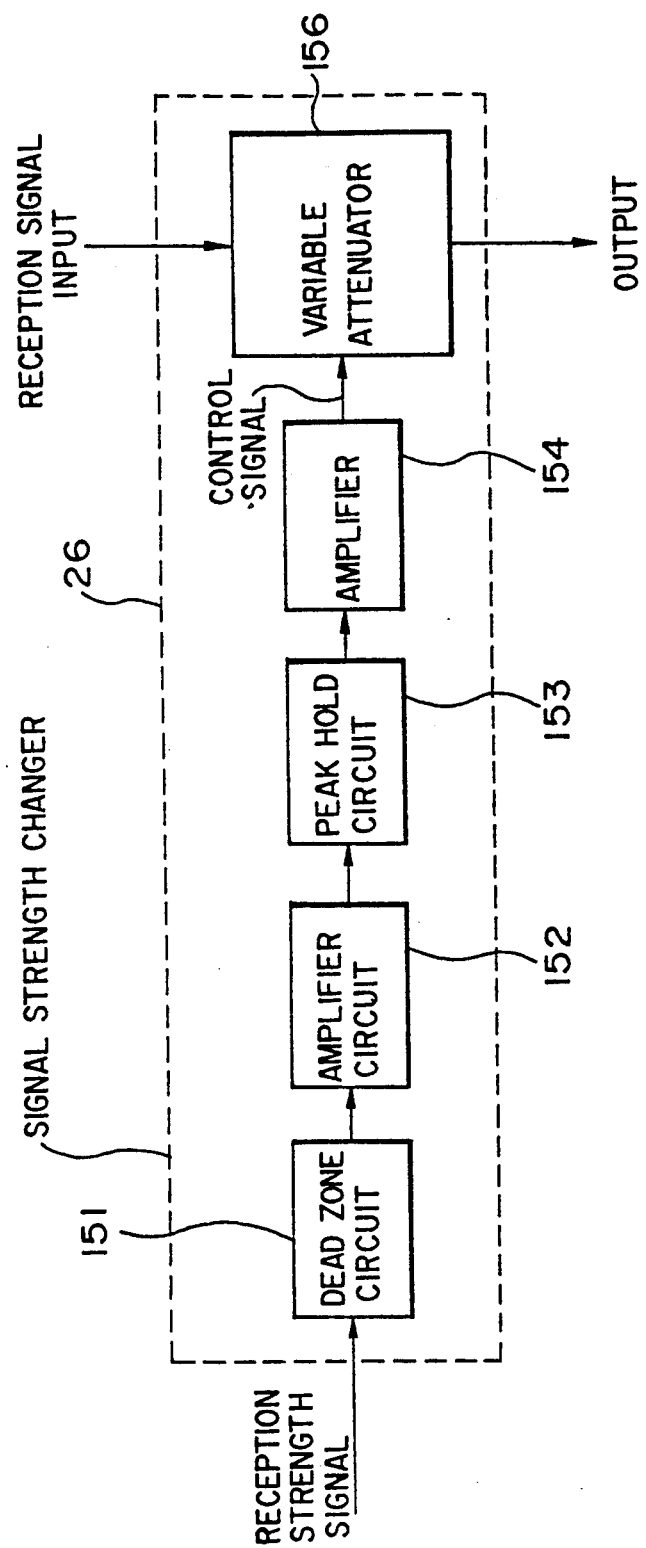
FIG. 14 is a block diagram showing amendment of the configuration of the signal strength changer.

FIG. 14 shows an embodiment of the signal strength changer 26. In this embodiment, a control signal is calculated on the basis of the peak of the reception strength signal fed from the microwave radar 52, so that the quantity of attenuation of the reception signal is adjusted on the basis of the control signal. A variable attenuator 156 included in the signal strength changer 26 performs attenuation proportionally to the signal strength of the input control signal. When there is no input control signal, the signal is passed as it is.

In the signal strength changer 26 in this embodiment, the reception strength signal from the adder 17 of the microwave radar 52 is inputted into a dead zone circuit 151. When the input signal does not reach a predetermined level, no control signal is generated so that there is no signal attenuating operation in the variable attenuation 156. When the input signal is larger than a limit value in the dead zone circuit 151, the signal is amplified by the amplifier 152 and then inputted into the peak hold circuit 153. The peak hold circuit has a time constant of the same degree as the period of the input pulse signal and holds the peak of the input pulse as an output thereof. A control signal for the variable attenuator 116 is attained by amplifying the held signal by the amplifier 154 and adding an offset thereto, so that the quantity of attenuation in the variable attenuator 156 is determined on the basis of the control signal.

Figure 15A:
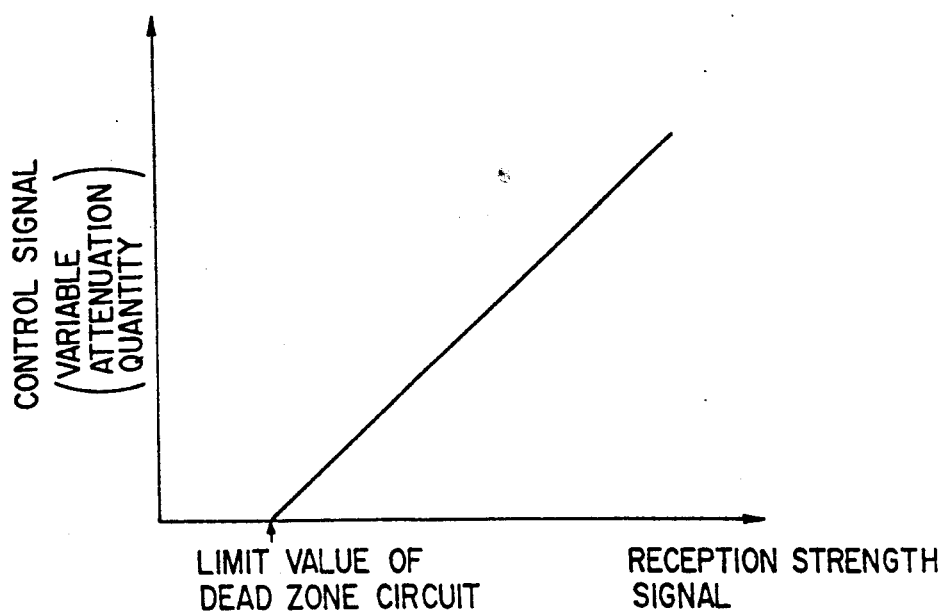
FIGS. 15a and 15b are graph views showing the operation of the signal strength changer.

FIG. 15a is a characteristic graph of the signal strength changer 26. In FIG. 15a, the output change of the control signal against the input reception strength signal, that is, the change of the quantity of attenuation in the variable attenuator 156, is shown. When the reception strength signal is not smaller than a limit value determined by the dead zone circuit 151, the control signal becomes a signal proportional to the reception strength signal. In this embodiment, the limit value is established to be 0.7 V. Accordingly, when the maximum of time reception strength signal is not smaller than 0.7 V, a control signal is generated.

Figure 15B:
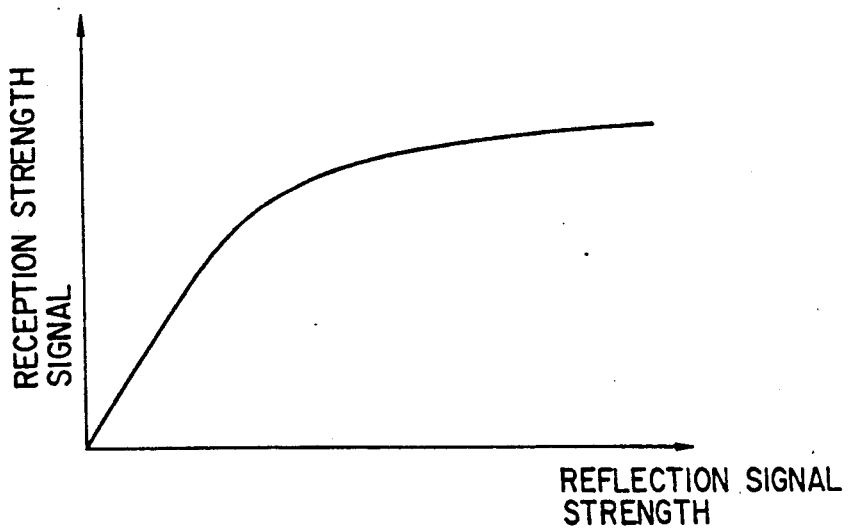

FIG. 15b is a characteristic graph of the signal level in the whole measuring apparatus and showing the relationship between the reflected signal strength received by the reception antenna 24 and the reception strength signal. In a region in which the reflected signal strength is small, the value of the reception strength signal is also small. Accordingly, signal attenuation in the signal strength charger 26 is not made, so that the reflected signal strength is proportional to the reception strength signal. As the reflected signal strength increases, signal attenuation in the signal strength changer 26 is started. Accordingly, the change of the reception strength signal can be reduced to a small value when the reflected signal strength changes by a value of the order of tens of dB.

Figure 16:
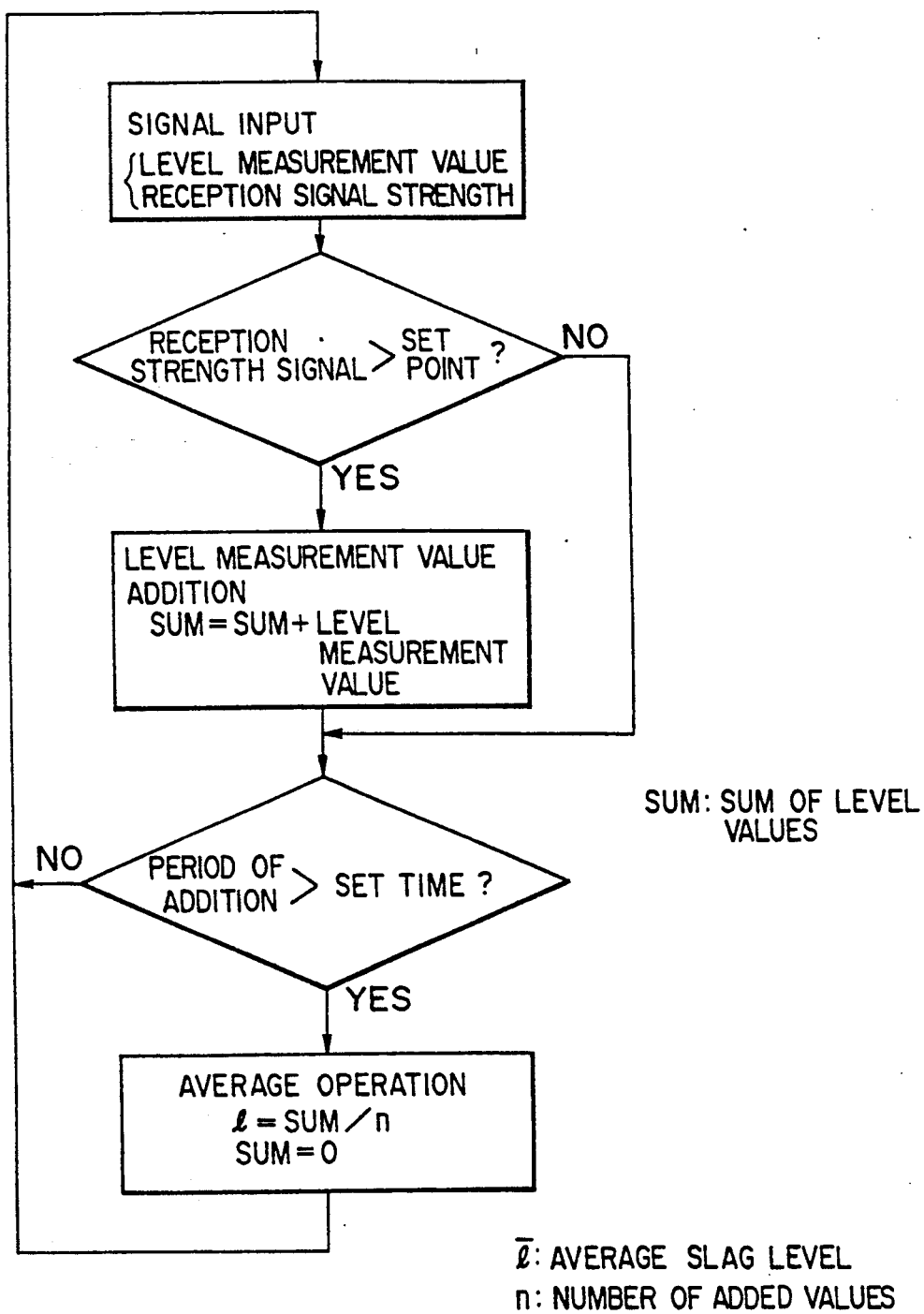
FIG. 16 is a flow chart showing the signal escape in an average operator.

FIG. 16 shows a flow chart of the average operation processing. As shown in FIG. 16, the average operation means 27 receives both the level measurement value from the distance scaler 18b of the microwave radar 52 and the reception strength signal from the adder 17. When the peak of the reception strength signal is larger than a predetermined not sets point, the input level measurement value is added to the sum of the level values. When it is smaller than the set point, the input level measurement value is not added. Then, when the number of times for addition reaches a set point the average slag level is calculated by dividing the sum of the level values by the number of times for addition. The sum of the level values is set to zero and then preparation for the next average operation is made. The situation of the procedure returns to first and the next signal inputting operation is made. When the number of times for addition does not reach a set point, the situation of the procedure returns directly to the next signal inputting operation.

In this embodiment, the series of average operation processings are made by a personal computer, and a result of the operation of the average slag level is sent to the CRT display unit 28.

What is claimed is:

1. An in-furnace slag level measuring apparatus comprising:
   a first rotator attached to a beam;
   a first supporting member connected to said first rotator so as to be rotated about said beam by said first rotator;
   a waveguide;
   a first lift connected to a top of said first supporting member for controlling up/down movement of said waveguide;
   a convertor with a lance hole;
   an antenna connected to said waveguide to be inserted into said convertor during the first and middle stages of refining period through said lance hole on said convertor hood by being driven by said first rotator and said first lift;
   a microwave radar connected to said antenna through said waveguide for transmitting microwave modulated by pseudo random signal through said antenna during the first and middle stages of refining period for receiving a reflection wave from the slag surface to measure a turnaround time of propagation and calculate the slag level from it;
   a second rotator attached to said beam;

a second supporting member connected to said second rotator so as to be rotated about said beam by said second rotator;

a second lift connected to a top of said second supporting member for controlling up/down movement of a sublance; and said sublance to be inserted into the convertor through said hold during the last stage of refining period by being driven by said second rotator and said second lift for performing various measurements.

2. An in-furnace slag level measuring apparatus according to claim 1, in which said microwave radar includes:

a first pseudo random signal generation means for outputting a first pseudo random signal;

a second pseudo random signal generation means for outputting a second pseudo random signal having a pattern the same as that of said first pseudo random signal and having a frequency slightly different from that of said first pseudo random signal;

a first multiplier for multiplying said first and second pseudo random signals by each other;

a carrier generation means;

a transmission means for transmitting a transmission signal based on said first pseudo, random signal to said slag surface;

a reception means for receiving a reflection signal from said slag surface to thereby obtain a reception signal;

a second multiplier for multiplying said reception signal by said second pseudo random signal to thereby output a carrier;

a detector means for detecting said carrier outputted from said second multiplier to thereby output a detection signal; and a time difference measurement means for measuring a time difference between a time series pattern of said detection signal outputted from said detector means and a time series pattern of a multiplication value outputted from said first multiplier.

3. An in-furnace slag level measuring apparatus according to claim 2, in which said microwave radar includes a carrier generation means for generating a carrier which is outputted as a transmission signal modulated with said first pseudo random signal.

4. An In-furnace slag level measuring apparatus according to claim 3, in which said detector means includes;

a first distributor for taking out a part of the output of said carrier generation means;

a hybrid coupler supplied with an output of said first distributor and for converting said output into an in-phase component, namely, an I signal and a quadrature component, namely a Q signal, said I and Q signals having phases perpendicularly intersecting each other;

a second distributor for distributing the output of said second multiplier not two signals, namely an R1 signal and an R2 signal;

a third multiplier for multiplying said the I signal outputted from said hybrid coupler by said R1 signal outputted from said second distributor; and a fourth multiplier for multiplying said Q signal outputted from said hybrid coupler by said R2 signal outputted from said second distributor.

5. An in-furnace slag level measuring apparatus according to claim 3, in which said time difference measurement means includes:

a first low-pass filter supplied with the output of said first multiplier to thereby perform a band limitation;

second and third low-pass filters supplied with output signals of said third and fourth multipliers respectively to thereby perform band limitations independently of each other;

first and second squarers supplied with output signals of said second and third low-pass filters respectively to thereby perform squaring operations independently of each other;

an adder for adding the respective output signals of said first and second squarers to each other; and a time measurer for measuring a time between a point of time when said output signal of said first low-pass filter takes its maximum value and a point of time when the output signal of said adder takes its maximum value.

6. An in-furnace slag level measuring apparatus according to claim 3, in which each of said first and second pseudo random signal generation means includes:

a counter for counting clock signal pulses to thereby output a count value;

a storage device from which stored data are read out while using the count value supplied from said counter as an address;

a signal convertor for converting the read-out stored data into a three-value signal as an output thereof; and said reception means being capable of changing signal reception sensitivity with the passage of time in synchronism with the period of the pseudo random signal.

7. An in-furnace slag level measuring apparatus according to claim 3, further comprising a signal strength changer interposed between said transmission means and said transmission antenna or between said reception antenna and said reception means, and for outputting an input microwave strength signal while changing said input microwave strength signal in accordance with a reception strength signal outputted form said detector means.

8. An in-furnace slag level measuring apparatus according to claim 7, further comprising an average operation means for averaging the level measurement value of said level measurement value signal.

9. An in-furnace slag level measuring apparatus according to claim 8, in which said average operation means has a function for performing an average operation while neglecting said level measurement value whenever the value of said reception strength signal is lower than a set point.

* * * * *